3,200,031
**AMINO-ORGANOSILICON COMPOUNDS AND RE-
ACTION PRODUCTS THEREOF WITH EPOXIDES
AS BONDING AGENTS IN COMPOSITE ARTI-
CLES AND PROCESS FOR PRODUCING SUCH
COMPOSITE ARTICLES**
Robert C. Rittenhouse, Kenmore, N.Y., assignor to Union
 Carbide Corporation, a corporation of New York
No Drawing. Filed May 27, 1959, Ser. No. 816,035
10 Claims. (Cl. 161—206)

This invention relates to novel methods for bonding members and to bonded members obtained thereby. More particularly, the invention is directed to methods for bonding silicone rubber, organic rubber, or metal to metal, silicone rubber, synthetic organic fabric or polyethylene terephthalate films and composite articles made by said methods.

The present invention provides novel methods for bonding certain members to certain other members of similar or dissimilar composition. Heretofore, members of certain composition, e.g., silicone rubbers in the fully cured state, were extremely difficult, if not impossible to bond to themselves or other dissimilar members by heretofore known processes. Uncured silicone rubbers have prior to this invention been cured on particular substrates, such as steel, to attach said rubbers to the substrates.

Such curing processes, however, were unwieldy and not well-suited for practical use because they involved the employment of special subtances (i.e., uncured silicone rubbers which are transitory in nature), and complex equipment, controls and techniques for preparing and handling the uncured silicone rubber. No such special substances are required in my novel methods which employ readily available, non-transitory materials. No complex equipment, controls or techniques are required to carry out my methods which are capable of easy performance. My methods are applicable to finished articles which are fully cured and which may be already formed or shaped in whatever manner desired.

The attaching of such members as silicone rubber, in the fully cured or even uncured state to such other members as organic rubbers, synthetic organic fabrics or polyethylene terephthalate films has not herefore been accomplished by adhesive bonding of polyethylene terephthalate films to silicone rubber, organic rubber or metal also has not heretofore been accomplished.

This invention is based on my discovery that adhesive compositions comprising amino-organosilicon compounds wherein the amino group is interconnected to silicon through at least three carbon atoms or a resin-forming material made by mixing said amino-organosilicon compound with an epoxy compound when disposed between and in adhesive contact with certain members of similar or dissimilar composition followed by heating to a temperature of at least 125° C. provide extremely strong bonds between said members. In accordance with this discovery, members having surfaces of silicone rubber, organic rubber or metal are readily and tenaciously bonded to members having surfaces of fully cured silicone rubber, fully cured organic rubber, synthetic organic fabric, metal or polyethylene terephthalate films.

The particular technique employed in disposing the adhesive composition between and in adhesive contact with the members to be joined is not critical. Any technique involving the application of the adhesive composition to one or both surfaces of the members to be joined is employed. For example, the adhesive composition is smeared, brushed, sprayed, or flooded onto the surfaces, or the surfaces are immersed in the adhesive compositions. The surfaces thus treated with the adhesive composition are then brought into contact with each other, or with untreated surfaces, and held there by sufficient pressure. No pressure in excess of that required to hold together the surfaces to be joined is required, although pressures can be employed, if desired.

The adhesive composition thus contacting both of the surfaces to be joined is then heated at a temperature of at least 125° C. to bond said surfaces. Much higher temperatures can be employed and, in fact, are preferably in order to provide bonds of optimum strength in the least amount of time. The upper limit for the temperature is, of course, limited by the temperature at which the amount of thermal degradation of one or both members, the surface of which are being joined, cannot be tolerated. The upper temperature depends on the type of surface being joined. For example, silicone rubber and metal can tolerate extremely high temperatures for long periods without encountering an undesirable degree of thermal degradation. Organic rubbers, synthetic organic fabrics and polyethylene terephthalate films deteriorate rapidly at the extremely high temperatures. It is recommended that to avoid undesirable amounts of thermal degradation when joining organic rubbers, synthetic organic fabrics and polyethylene terephthalate films that temperatures not greater than 200° C. be employed. When joining silicone rubber metal much higher temperatures can be employed, for example, up to 275° C. Of course, higher temperatures in any operation usually require special techniques and equipment and are therefore, not desirable.

The lower the temperature employed the longer the time needed to provide optimum bonding strength. However, in view of possible thermal degradation it may be desirable in a general sense to employ lower temperatures and longer heating times rather than higher temperatures and shorter heating times. A temperature-time balance is easily determined in each particular circumstances.

Silicone rubbers comprising the surfaces of members adhesively joined by this invention are well known. Broadly, silicone rubbers comprise long siloxane chains which are cross-linked usually by organic linkages attached to silicon atoms of different siloxane chains to form an elastomeric network. Silicone rubbers are made from silicone gums, i.e., substantially linear siloxanes of such high molecular weight and long chain length as to have the gum-like consistency. These linear siloxane gums have an average of about two organic substituents on each silicon atom. Some, if not all, of the organic substituents are capable of reacting (under the influence of a curing catalyst) organic substituents bonded to a different siloxane chain to form cross-links between the different chains. After a sufficient proportion of these cross-links have been formed an elastomeric network, or silicone rubber, results. Siloxane gum having methyl and/or vinyl groups (as the cross-linking substituents) bonded to silicon are the most widely used in preparing silicone rubbers. Of course, other organic substituents such as phenyl groups, $\beta$-cyanoethyl groups, ethyl groups and so on can be also bonded to silicon in addition to the methyl and/or vinyl groups. Cross-linking through the methyl groups is accomplished by heating in the presence of a peroxide catalyst, such as, benzoyl peroxide, while cross-linking through vinyl groups is accomplished by heating in the presence of a di-tert-alkyl peroxide. Special techniques and further details relating to the preparation of silicone rubbers are readily available in the art of silicon chemistry.

Metals comprising the surfaces of members joined in accordance with this invention include the substantially pure metals and alloys thereof, for example, steel, tin, copper, bronze, aluminum, brass, zinc, silver, magnesium, tinplate, chromium, lead, and the like.

Synthetic organic fabrics employed as surfaces to be joined include nylon cloth, rayon cloth, "Dacron" cloth (woven ethylene glycol-terephthalate polyester fibers), "Dynel" cloth (woven vinyl chloride-acrylonitrile copolymer fibers) and the like.

Also, surfaces comprising films of polyethylene terephthalate polyesters can be joined in accordance with this invention. Such films are available commercially in various thicknesses under the Du Pont trademark "Mylar." For brevity, the trademark "Mylar" is also employed herein to designate the polyethylene terephthalate polyester films. The polyethylene terephthalate polyesters are polyesters of ethylene glycol and terephthalic acid or derivatives thereof, such as dimethyl terephthalate.

The surfaces of members adhesively joined by this invention also comprise any of the organic rubbers, including natural and synthetic rubbers. The natural and synthetic rubbers are well known and generally are comprised of polymerized conjugated diolefines such as polybutadiene, polymerized isoprene, polymerized chloroprene and the like. The natural rubbers, of course, are the sulfur-vulcanized latexes. Typical synthetic rubbers are neoprene, SBR rubber (previously known as GRS rubber), nitrile rubbers and the like. These rubbers as well as Mylar, synthetic organic fabrics and silicone rubbers are described in "Polymer Processes," edited by Calvin E. Schildknecht and published by Interscience Publishers Inc., New York, 1956 (pages 164, 194–198, 224, 247–259, 292, 293, 412–417, 449, 511, 519, 521, 627, 638, 726, 727, 754, 842, 861–867, 858–861 and 874–876, volume X, High Polymers Series).

The composite articles of this invention comprise the products obtained from the novel method described herein. These articles comprise a member having a surface from the class consisting of silicone rubber, organic rubber and metal, a second member having a surface from the class consisting of metal, synthetic organic fabric, silicone rubber and polyethylene terephthalate film, and an adhesive material from the class consisting of (1) an amino-organosilicon compound wherein the amino group is interconnected to silicon through at least 3 carbon atoms and (2) a resin-forming material made from said amino-organo-silicon compound and an epoxy compound, said adhesive material being disposed between and cured in adhesive contact with both of said surfaces.

The adhesive compositions employed in any method comprise (1) an amino-organosilicon compound wherein the amino group is interconnected to silicon through at least three carbon atoms or (2) a resin-forming material made from said amino-organosilicon compound and an epoxy compound.

Amino-organosilicon compounds include amino-organosilanes having at least one amino nitrogen atom connected to silicon through not less than 3 carbon atoms and from 1 to 2 amino hydrogen atoms bonded to the nitrogen atom or an amino-organosiloxane polymer having silicon atoms inter-connected by oxysilicon bonds, at least one amino nitrogen atom connected to silicon through not less than 3 carbon atoms and from 1 to 2 amino hydrogen atoms bonded to the nitrogen atom.

Thus, amino-organosilicon compounds which are employed in the adhesive compositions are compounds containing one silicon atom or more than one silicon atom interconnected with each other by silicon to oxygen to silicon linkages and one or more amino groups containing at least one nitrogen bonded hydrogen

connected to silicon through at least three carbon atoms of a hydrocarbon group. These compounds include those represented by the formula:

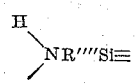

wherein R'''' is a divalent hydrocarbon group of at least three carbon atoms; the nitrogen atom is connected through at least 3 carbon atoms to the silicon atom, the unfilled valence of the nitrogen is satisfied by a monovalent organic group, e.g., hydrogen, aminoalkyl and hydrocarbyl, or [—R''''Si≡] through carbon to nitrogen linkage; the silicon atom is bonded to one to three oxygen atoms which in turn are bonded to no other groups than hydrogen, hydrocarbyl and silicon; and each remaining unfilled valence of all silicon atoms is satisfied by hydrocarbyl or

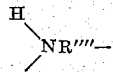

through carbon to silicon linkage and R'''' and the unfilled valence of nitrogen is satisfied as defined above.

Amino-organosilicon compounds which are particularly suitable for the adhesive compositions are the aminoalkylsilicon compounds such as the aminoalkylsilanes and the aminoalkylpolysiloxanes, including copolymeric materials which contain both aminoalkylsiloxane units and hydrocarbylsiloxane units. Each of these classes of aminoalkylsilicon compounds contains one or more characteristic group:

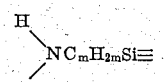

wherein $C_mH_{2m}$ is a divalent alkane group; $m$ is an integer of at least 3; the nitrogen atom is at least three carbon atoms removed from silicon; the unfilled valence of nitrogen is satisfied by a member from the class of hydrogen, hydrocarbyl and [—$(C_mH_{2m})$Si≡] through carbon to nitrogen linkage; the silicon atom is connected through one to three oxysilicon bondages to one to three members of the class of hydrogen, hydrocarbyl and silicon; and each remaining unfilled valence of all silicon atoms is satisfied by a member of the class of

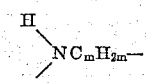

through carbon to silicon linkages and the unfilled valence of nitrogen is satisfied as defined above.

Aminoalkylsilicon compounds which are exceptionally useful in the adhesive compositions are composed of one silicon atom bonded to one to three oxygen atoms or several silicon atoms each bonded to one to three oxygen atoms and interconnected through oxysilicon bonds. There is at least one aminoalkyl group

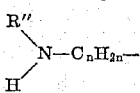

R'' and $n$ being particularly defined hereinafter, attached to silicon through silicon to carbon bondage, the amino moiety of the aminoalkyl group being attached to an alkyl carbon atom, i.e., a carbon atom of the alkyl moiety, which is at least one alkyl carbon atom removed from the alkyl carbon atom attached to silicon. The silicon bonded oxygen atom is bonded to another silicon atom or to a member from the class of hydrogen and a hydrocarbyl group. Each remaining unfilled valence of silicon is satisfied by a hydrocarbyl group. By the term "hydrocarbyl" as used herein, is meant a monovalent group composed of carbon and hydrogen, such as alkyl, aryl, alkenyl and the like. Illustratively, hydrocarbyl is methyl, ethyl, phenyl, vinyl or the like. These aminoalkylsilicon compounds are represented by the formula:

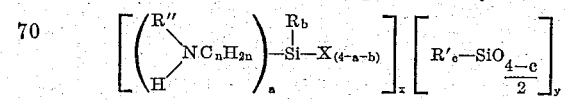

In this formula:

(1) R' and R'' are hydrogen or hydrocarbyl and need not be the same throughout the same molecule;
(2) R is hydrocarbyl, hydroxy or hydrocarbyloxy, preferably alkoxy or aryloxy, and need not be the same throughout the same molecule;
(3) X is hydroxy, hydrocarbyloxy, preferably alkoxy or aryloxy, or $O_{1/2}$;
(4) $n$ is an integer from 3 to 9;
(5) $a$ is an integer from 1 to 3;
(6) $b$ is an integer from 0 to 2;
(7) $c$ is an integer from 0 to 3;
(8) $a+b$ is an integer from 1 to 3;
(9) $x$ is an integer equal to one when X is hydroxy or or hydrocarbyloxy and a mole fraction greater than 0, but not greater than 1 when X is $O_{1/2}$;
(10) $y$ is equal to zero when X is hydroxy or hydrocarbyloxy and a mole fraction from 0 to less than 1 when X is $O_{1/2}$;
(11) $x+y$ is equal to 1; and
(12) The amino group, $-NH_2$, is attached to a carbon atom which is at least two carbon atoms removed from silicon.

Thus, the formula illustrates aminoalkylsilanes, aminoalkylpolysiloxanes composed of only aminoalkylsiloxane units and aminoalkylsiloxane-hydrocarbylsiloxane copolymers composed of both aminoalkylsiloxane units and hydrocarbylsiloxane units, all of which being particularly useful in my compositions. These siloxanes are also hereinafter referred to as the aminoalkylsilicones.

Typifying the aminoalkylsilanes which are used in my invention are those compounds represented by the structural formula:

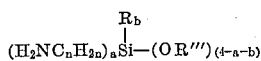

wherein R''' is hydrogen or hydrocarbyl, preferably hydrogen or alkyl, such as methyl, ethyl, propyl, and butyl, and the like, R is hydrocarbyl, $n$ is an integer from 3 to 9 and preferably from 3 to 4, $a$ is an integer from 1 to 3 and preferably from 1 to 2, $b$ is an integer from 0 to 2 and preferably from 0 to 1, the sum of $a+b$ is not greater than 3, and $-NH_2$ is attached to carbon which is at least two carbons removed from silicon. Illustrative of such aminoalkylsilanes are gamma - aminopropyltriethoxysilane, gamma - aminopropyltripropoxysilane, gamma-aminopropylmethyldiethoxysilane, gamma-aminopropylethyldiethoxysilane, gamma - aminopropylphenyldiethoxysilane, delta - aminobutyltriethoxysilane, delta - aminobutylmethyldiethoxysilane, delta - aminobutylethyldiethoxysilane, delta - aminobutylphenyldiethoxysilane, gamma-aminobutylmethyldiethoxysilane, gamma - aminobutyltriethoxysilane, and the like. The aminoalkylalkoxysilanes are disclosed as new compositions of matter in United States Patents Nos. 2,832,754 and 2,930,809. Processes for producing these compounds are also disclosed in said copending applications.

Typical of the aminoalkylpolysiloxanes which are used in the adhesive compositions are those polysiloxanes having the formula:

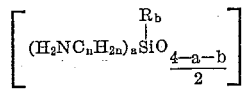

wherein R, $n$, $a$, $b$ and the position of the $-NH_2$ group are as described above. Such polysiloxanes are prepared by the hydrolysis and condensation of those aminoalkylsilanes described above or by the cohydrolysis and cocondensation of mixtures of such aminoalkylalkoxysilanes and include aminoalkylpolysiloxanes of the trifunctional variety (i.e., where $a=1$ and $b=0$), aminoalkylalkylpolysiloxanes and aminoalkylarylpolysiloxanes of the difunctional variety which include cyclic or linear polysiloxanes (i.e., where $a=2$ or $a=1$ and $b=1$), and aminoalkyldialkyldisiloxanes, aminoalkyldiaryldisiloxanes and aminoalkylalkylaryldisiloxanes of the monofunctional variety (i.e., where $a=3$, $a=2$ and $b=1$ or $a=1$ and $b=2$) as well as the mixture of compounds produced by the cohydrolysis of difunctional, trifunctional and monofunctional aminoalkylsilanes.

Suitable aminoalkylpolysiloxanes of the variety which are trifunctional with respect to silicon can be more specifically depicted as having the formula:

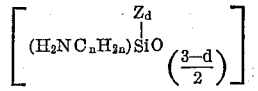

wherein $n$ and the position of $-NH_2$ are as previously described, Z represents hydroxyl and/or alkoxy group, and $d$ has an average value of from 0 to 1 and can be as high as 2 but preferably from 0.1 to 1. Aminoalkylpolysiloxanes of this variety which are essentially free of silicon-bonded alkoxy or hydroxyl groups (i.e., where $d=0$) can be prepared by the complete hydrolysis and complete condensation of aminoalkyltrialkoxysilanes, whereas aminoalkylpolysiloxanes in which Z represents predominantly silicon-bonded alkoxy groups can be prepared by the partial hydrolysis and complete condensation of the trifunctional starting silane. On the other hand, aminoalkylpolysiloxanes in which Z represents predominantly silicon-bonded hydroxyl groups can be prepared by the essentially complete hydrolysis and partial condensation of the starting aminoalkyltrialkoxysilanes. By the way of illustration, a gamma-aminopropylpolysiloxane containing silicon-bonded ethoxy groups can be prepared by hydrolyzing gamma-aminopropyltriethoxysilane with an amount of water insufficient to react with all of the silicon-bonded ethoxy groups present on the starting silane and subsequently condensing the hydrolyzate so formed to produce the desired polymer.

Suitable aminoalkylpolysiloxanes of the variety which are difunctional with respect to silicon, including cyclic and linear polysiloxanes, can be more specifically depicted by the formula:

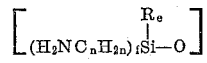

wherein R, $n$ and the position of $-NH_2$ are as previously described. $f$ is an integer from 1 to 2, $e$ is an integer of 0 to 1 and $f+e$ is 2. The cyclics contain from 3 to 7 siloxane units and the linears range much higher. Such cyclic and linear aminoalkylpolysiloxanes can be prepared by the hydrolysis and condensation of aminoalkylalkyldialkoxysilanes or aminoalkylaryldialkoxysilanes. In carrying out the hydrolysis and condensation procedures there is produced a product comprising a mixture of cyclic and linear polysiloxanes which is employed as a mixture or separated to provide whatever siloxane is desired. Illustrative of the cyclic aminoalkylsiloxanes suitable for use in the adhesive compositions are the cyclic tetramer of gamma-aminopropylmethylsiloxane, the cyclic tetramer of delta-aminobutylphenylsiloxane and the like. Illustrative of linear aminoalkylpolysiloxanes suitable for use in the adhesive compositions are gamma-aminopropylmethylpolysiloxane, gamma - aminopropylethylpolysiloxane, delta - aminobutylmethylpolysiloxane and the like.

Included among the linear aminoalkylpolysiloxanes are the alkyl, alkoxy and hydroxyl end-blocked polysiloxanes which contain from 1 to 3 of such end-blocking groups bonded to the terminal silicon atoms of the molecules comprising the polymeric chains. Thus, I can also employ as the aminoalkylsilicone such linear end-blocked aminoalkylpolysiloxanes as trimethylsilyl end-blocked gamma-aminopropylethylpolysiloxane or methyldiethoxysilyl end-blocked delta-aminobutylmethylpolysiloxane or monoethoxydimethylsilyl end-blocked gamma-aminopropylphenylpolysiloxane and the like. The end-blocked linear aminoalkylalkylpolysiloxanes and aminoalkylarylpolysiloxanes useful in our process can be prepared by the equilibration of cyclic aminoalkylsiloxanes with silicon compounds containing predominantly silicon-bonded alkoxy groups, or by the cohydrolysis and condensation of trialkylalkyoxysilanes with aminoalkylalkyldiethoxysilanes or aminoalkylaryldiethoxysilanes. Hydroxyl end-blocked linear polysiloxanes can also be prepared by heating linear or cyclic aminoalkylpolysiloxanes with water.

Typical copolymeric aminoalkylpolysiloxanes which can be employed in my process can be depicted as having the formula:

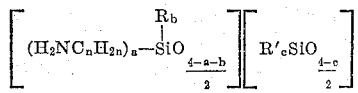

wherein R, R', n, a, b, c and the position of —NH$_2$ as previously defined. The copolymeric materials described herein include copolymers having two or more different units. The copolymers suitable for use in my compositions can contain various combinations of siloxane units such as trifunctional aminoalkylsiloxane units (where $a=1$ and $b=0$) with trifunctional hydrocarbyl, e.g., alkyl-, aryl-, olefinic-, or mixed hydrocarbyl units (where $c=1$) or with difunctional hydrocarbyl or mixed hydrocarbyl siloxane units (where $c=2$). Copolymers containing other combinations of siloxanes units are useful, e.g. difunctional aminoalkylsiloxane units (where $a=1$ and $b=1$ or $a=2$ and $c=0$) with trifunctional hydrocarbyl or mixed hydrocarbyl siloxane units (where $c=1$) or with difunctional hydrocarbyl siloxane units (where $c=2$).

Those polymers which contain trifunctional aminoalkylsiloanxe units and other hydrocarbyl siloxane units are preferably prepared by the cohydrolysis and cocondensation of the corresponding alkoxysilane starting materials. Such copolymers can contain silicon-bonded alkoxy and/or hydroxyl groups or they can comprise essentially completely condensed materials. The linear and cyclic copolymeric siloxanes are prepared by the method just described or by the separate hydrolysis and condensation of an aminoalkylalkyldialkoxysilane and the dihydrocarbyldialkoxysilanes, such as dialkyldialkoxysilane, diolefinicdialkoxysilane, alkylaryldialkoxysilane, mono-alkyl - mono - olefinic-dialkoxysilane, mono-aryl-mono-olefinic dialkoxysilane, or diaryldialkoxysilane to form, respectively, cyclic aminoalkylsiloxanes and cyclic dihydrocarbylsiloxanes, such as, alkylarylsiloxanes, dialkylsiloxanes, diolefinicsiloxanes, mono-alkyl-mono-olefinicsiloxanes, mono-aryl-mono-olefinicsiloxanes or diarylsiloxanes, and subsequently equilibrating mixtures of such cyclic siloxanes to linear copolymers. Such linear copolymers can also contain chain-terminating or end-blocking groups such as alkyl, alkoxy, or hydroxyl groups.

The polymeric and copolymeric aminoalkylsiloxanes can be varied as to molecular weight, type and functionality of silanic-bonded hydrocarbyl groups, ratio of silanic-bonded aminoalkyl groups to silanic-bonded hydrocarbyl groups in order to develop special properties in adhesive bonds made from compositions containing them.

Aminoalkylsiloxanes and aminoalkylsilanes, their copolymers and processes for preparing them are also disclosed in U.S. Patent Nos. 2,928,858, 2,929,829 and 2,947,771.

Any amino-organosilicon compounds of the types described above whether silanes or siloxanes, cyclics, oils, gums, resins or otherwise are useful in making the adhesive compositions. Mixtures of different amino-organosilicon compounds or mixtures of amino-organosilicon compounds and other hydrocarbylsilicon compounds, such as, the hydrocarbylsilanes and hydrocarbylsiloxanes, e.g., dimethyldialkoxysilane, phenyltrialkoxysilane, triethylalkoxysilane, the dimethyl oils, the phenylmethyl oils, the methylsiloxane resins and the like can also be used. An important aspect of this invention is the use of mixtures of amino-organosilanes and hydrocarbylsilanes containing one or more hydrocarbyloxy, preferably alkoxy groups, to the molecule as reactive components in the adhesive compositions in addition to the aminoalkylsilicon components.

The hydrocarbylsilicon compounds, including the hydrocarbylsilanes and the hydrocarbylsiloxanes are well known to those skilled in the art. These compounds can be represented by the formula:

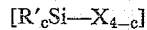

wherein R', X and c have been previously defined. Preferred amongst these compounds are those containing one or more silicon bonded alkoxy groups. The preparation of these compounds are also well known to those skilled in the art and reference is herein made to the numerous United States patents and scientific textbooks and journal articles relating to silicon compounds and their preparation.

An important embodiment of the adhesive compositions comprise amino-organosilicon compounds, hydrocarbylsilicon compounds and epoxy compounds. All of these compounds are described herein. Equally important adhesive compositions contain, in addition to the above-listed reactive components, a volatile organic diluent.

Epoxy compounds which are used in adhesive compositions are organic compounds containing at least one pair of vicinal carbon atoms to which oxirane oxygen is attached

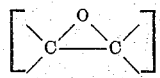

These compounds are for the most part composed of carbon, hydrogen, and oxygen but can also contain such other atoms as nitrogen, sulfur, halogen, phosphorus, silicon, boron and the like. Typical epoxy compounds are represented by the formula:

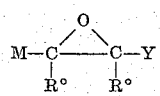

wherein R° represents alkyl or hydrogen and need not be the same throughout the same molecule; each of the group M and Y represents hydrogen or a monovalent group composed of a single carbon atom or a group of carbon atoms interconnected by single or multiple bonds and to which such groups as hydrogen, alkyl, hydroxyl, alkoxy, amino, cyclic hydrocarbon groups and the like or combinations thereof can be attached. As groups of carbon atoms, M and Y can contain open chain, e.g., aliphatic or cyclic, e.g., cycloaliphatic or aromatic and heterocyclic groups or combinations thereof. M and Y can also contain one or more oxirane oxygen atoms attached to vicinal carbon atoms. M or Y or both can represent alkoxyalkyl groups or groups of carbon atoms interconnected by ether linkages,

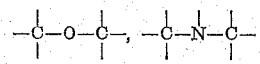

linkages, thio linkages,

and the like. M and Y taken together with the vicinal carbon atoms shown can represent a cyclic group such as a cyclohexane ring or a cyclopentane ring, substituted or unsubstituted with other groups, e.g., alkyl, aryl substituents and the like. The presence of other groups not otherwise specifically mentioned herein is by no means harmful and, in fact, are useful in developing special properties in adhesive bonds formed from the compositions containing such epoxy compounds. For example, M or Y or both can contain one or more olefinic double bonds or acetylenic bonds. Thus, the epoxy compound employed in the adhesive compositions is selected from the class of monoepoxides and polyepoxides particularly monoepoxides, diepoxides and triepoxides or mixtures thereof. By the term "epoxy," as used herein in designating a group or compound, is meant a group composed of or a compound containing oxirane oxygen attached to vicinal carbon atoms,

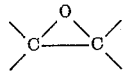

Representative of the epoxy compounds defined above are the aliphatic, cycloaliphatic, aliphatic-substituted aromatic and cycloaliphatic-substituted aromatic monoepoxides and polyepoxides, such as, butadiene dioxide, the epoxyoctanes, the epoxybutanes, the epoxyhexadecanes, the epoxyoctadecanes, gamma-glycidoxypropyltriethoxysilane, 4,5-epoxypentyltriethoxysilane, cyclohexene, vinylcyclohexene dioxide, cyclopentene monoxide, dicyclopentadiene dioxide, glycidyl propyl ether, glycidyl allyl ether, diglycidyl ether, 1,2-epoxyethylbenzene, glycidyl phenyl ether, glycidyl butyl ether, 1,2,3-tri(1,2-epoxypropoxy)propane (the triglycidyl ether of glycerine), 3,4-epoxycyclohexylmethyl 3,4-epoxycyclohexanecarboxylate, 1,6-hexanediol bis(3,4-epoxycyclohexane-carboxylate), 1,1,1-trimethylolpropane tris(3,4 - epoxycyclohexanecarboxylate) bis(3,4 - epoxy - 6 - methylcyclohexylmethyl) maleate, bis(2,3-epoxycyclopentyl) ether, allyl 2,3-epoxycyclopentyl ether, divinylbenzene dioxide, epichlorhydrin, and the reaction products of halohydrins and polyhydric phenols, i.e., the polyglycidyl polyethers of polyhydric phenols, as for example, the diglycidyl ethers of 4,4'-dihydroxydiphenyl-2,2-propane, 4,4' - dihydroxydiphenylmethane and the like and the higher polymers thereof as represented by the formula;

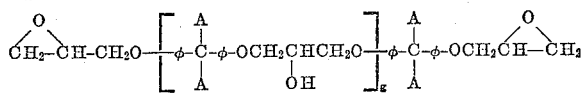

where A is hydrogen or alkyl, $\phi$ is phenylene, and $g$ is a number representing the average chain length of the polymer. This formula, of course, is ideal and in practice does not in all cases truly represent all the compounds actually obtained by the reaction of epichlorhydrin and polyhydric phenols. Thus mixtures of the diglycidyl polymers of varying molecular weight and some polymers of higher and lower glycidyl content, e.g., the triglycidyl and monoglycidyl polymers, are obtained in said reaction. The term "diglycidyl ether of a polyhydric phenol," e.g., bisphenol A, hence, includes any such mixtures obtained in practice as well as the pure diglycidyl polymer. The polyglycidyl polyethers are best characterized by their epoxy equivalency, i.e., the grams of polyglycidyl polyether which contains one gram-mole of epoxy group, and their melting points or melting point ranges (such as are determined by Durran's mercury method) or their viscosities. The polyhydric phenols, 4,4'-dihydroxydiphenyl-2,2-propane and 4,4'-dihydroxydiphenyl methane are hereinafter referred to as bisphenol A and bisphenol F, respectively.

A large number of epoxy compounds are commercially available. Nevertheless, they also can be made by several methods known in the art. One versatile method involves the epoxidation of organic compounds containing olefinic unsaturation employing as epoxidizing agent any one of a variety of peroxides such as peracetic acid, performic acid, perbenzoic acid, acetaldehyde monoperacetate and the like. For example, vinylcyclohexene is epoxidized by peracetic acid to vinylcyclohexane dioxide. Epoxidations of this kind are amply described in the literature and reference is made to United States Patents 2,716,123; 2,745,847; 2,750,395 and 2,785,185 and to Chemical Reviews, volume 45, Number 1, August 1949, pages 1 through 68. Epoxy compounds can be also prepared by the reaction of halohydrins e.g., epichlorhydrin, with monohydric or polyhydric compounds, e.g., phenols and polyhydric phenols. Such reactions are carried out in accordance with methods well known in the art and generally involve the reaction of halohydrin and hydric compounds in the presence of sufficient caustic alkali, or other strong alkali, to combine with the halogen of the halohydrin. These methods are amply described in the literature, for example, in the United States Patents 2,506,486; 2,582,985; 2,592,560 and 2,615,007.

Adhesive compositions comprising the resin-forming material are made by forming mixtures of the amino-organosilicon compounds and the epoxy compounds. Mixtures thus formed can be applied as such to the article being coated or, particularly when an amino-organosilane is employed, such mixtures can be induced to partially react thus forming an adduct of the silicon compound and epoxy compounds. This procedure of partially reacting is herein called ripening and in addition to providing the advantageous effects hereinafter set forth is also employed when gaseous epoxides are used. The partially reacted or ripened mixture then can be applied to the surfaces being joined. The amino-organosilane-epoxy mixtures as a class have been found to possess longer shelf-lives than amino-organosiloxane-epoxy mixtures as a class. For this reason the amino-organosilane-epoxy mixtures can be advantageously pre-reacted prior to application to promote more rapid drying and curing once applied and to provide higher viscosities as desired. The amino-organosiloxane-epoxy mixtures on the other hand are very rapid drying and curing and need not be pre-reacted to provide a higher viscosity.

Ripening is believed to involve a coupling reaction of the amino group of the amino-organosilicon compound and the epoxy group of the epoxy compound. This coupling reaction occurs at a finite rate and is affected by temperature, relative concentrations of reactants, solvents or diluents, the presence of catalyst, steric factors and other variables.

Several advantageous methods are employed in ripening the adhesive compositions. In accordance with these methods the amino-organosilicon-epoxy mixture is (1) stored at atmospheric temperatures; (2) stored at elevated temperatures; (3) refluxed in solvent; or (4) heated in solvent to fractionate out any by-products of condensation. Ripening is accelerated at elevated temperatures. Thus, storing, refluxing or heating at high temperatures decreases the ripening time. Ripening occurs more quickly when aminoalkylsiloxanes are employed in the adhesive compositions than when aminoalkylsilanes are employed. As illustrative of the ripening process in producing the compositions, a gamma-aminopropylphenyl-silicone copolymer,

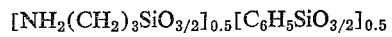

(having an aminohydrogen equivalent weight of about 120) and a diglycidyl ether of bisphenol A (having an epoxy equivalency of about 192) were mixed in such proportions as to provide two amino hydrogen equivalents of the silicone for each epoxy equivalent of the epoxide. The mixture was diluted to 7.5 percent solids by adding a solvent comprising 60 parts toluene and 40 parts methyl "Cellosolve" and allowed to ripen at room temperature for 3 to 5 days. (Alternatively, the mixture is refluxed for 4 to 16 hours.) At the end of this time the mixture was found to be suitably ripened. As a further illustration of the ripening process, 221 grams (1 mole) of gamma-aminopropyltriethoxysilane, 239 grams (1 mole) of phenyltriethoxysilane and 192 grams (1 epoxy equivalent weight) of diglycidyl ether of bisphenol A (having an epoxy equivalency of about 192) were admixed. Three portions of the mixture were ripened by the following three methods (a) stored at 70° C. for three weeks during which period the viscosity increases from that of a thin liquid to about 25,000 centipoises; (b) an equal weight of toluene was added and the solution refluxed for 6 to 24 hours; (c) an equal weight of toluene was added and the solution heated to evolve ethanol. Each of the compositions thus obtained were diluted with solvent and were found to be suitably ripened.

The relative proportions of amino-organosilicon compound and epoxy compound contained by the adhesive compositions are not narrowly critical and can be varied over a wide range. I have employed compositions of the type described herein which contain amounts of epoxy compound providing from 0 to 1.0 epoxy equivalent for each amino hydrogen equivalent provided by the aminoalkysilicon compound contained by the composition. Proportions of amino-organosilicon compound and epoxy compound falling in this range form resins on curing and when employed in the uncured state in my method provide strong adhesive bonds. By the term "epoxy equivalents," as used herein, is meant the number of moles of epoxy groups,

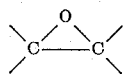

contained by a given amount of epoxy compound. Thus, one mole of monoepoxide contains one epoxy equivalent, and so forth. The term "epoxy equivalency," as used herein, means the number of grams of an epoxy compound which contains one gram-mole of epoxy group and is the epoxy equivalents. The term "amino hydrogen equivalents," as used herein, means the number of moles of amino hydrogen atoms, H−, attached to nitrogen, contained by a given amount of amino-organosilicon compound. Thus, one mole of gamma-aminopropyltriethoxysilane contains two amino hydrogen equivalents, one mole of gamma-aminopropylphenyl cyclic tetramer contains eight amino hydrogen equivalents and so forth. Compositions comprising amounts of epoxy compound containing epoxy equivalents and amounts of amino-organo-silicon compound containing one amino hydrogen equivalent have been found to be capable of providing excellent adhesive bonds. The amount of hydrocarbylsilicon compound, in particular hydrocarbylsilane, when used in the adhesive compositions, also is not narrowly critical and can be varied over a wide range. Thus, a molar ratio of 1 mole of hydrocarbylsilane, e.g., phenyltriethoxysilane, or mixtures thereof, per mole of amino-organosilane, e.g., gamma-aminopropyltriethoxysilane, or mixtures thereof, provide excellent adhesive compositions and molar ratios above and below the equimolar ratio are also advantageously used.

The amino-organosilicon compound or the resin-forming material as described above are employed with or without a volatile organic diluent. Adhesive compositions containing as little as 5 weight per cent of the amino-organosilicon compound or the resin-forming material and 95 weight percent of volatile organic diluent have been employed to provide strong adhesive bonds. Adhesive compositions containing from 5 to 100° weight percent amino-organosilicon compound or resin-forming material and 95 to 0 weight percent volatile organic diluent have provided strong adhesive bonds. It has been found to be expedient to employ the higher concentrations of amino-organosilicon compound or resin-forming material the more porous the surfaces of the members being joined.

Volatile organic diluents which can be employed in the preferred compositions include any volatile liquid or solid organic compounds which are free of groups which substantially react with the amino-organosilicon compounds at atmospheric temperatures and pressures. These diluents include volatile solids and liquids from the hydrocarbon, chlorinated hydrocarbon, nitrogenated paraffins, hydrocarbon ether and hydrocarbon alcohol series. The diluents include the solvents for the amino-organosilicon compound and the amino-organosilicon-epoxy mixture or adduct and non-solvents therefor. When non-solvent liquid diluents are used a suitable emulsifier must be included in order to obtain a uniform diluted mixture. Liquid diluents which are solvents are the easiest to use and hence are preferred. These liquid solvents when mixed with the amino-organosilicon compound or the amino-organosilicon-epoxy mixture or adduct provide liquid solutions which are simple to prepare and can be readily varied in concentration so as to allow the versatile use of the adhesive composition. A single diluent or mixtures of diluents can be used.

The adhesive compositions containing volatile organic diluents in addition to the amino-organosilicon and epoxy compounds are particularly advantageous in that the shelf-lives of such compositions are much greater than similar compositions containing no organic diluent. Compositions containing diluents are further advantageous from the standpoint of convenience and economy where it has been found that even extremely thin films laid down from such compositions provide superior adhesive bonding. These and other advantageous effects make the adhesive compositions containing organic diluents a preferred embodiment for use in my invention.

Volatile diluents include the saturated and unsaturated hydrocarbons, e.g., heptane, cyclohexane, heptene, mineral spirits (i.e., volatile hydrocarbons derived low boiling petroleum fractions) toluene, xylene, tetrahydronaphthalene, decahydronaphthalene and the like; the halogenated hydrocarbons, e.g., chlorobenzene, chloroform, carbontetrachloride, trichloroethylene, dichloroethylether and the like; the nitrogenated paraffins, e.g., nitropropane, hydrocarbon ether, e.g., isopropyl ether, diphenyl ether, dioxane, and the like; hydrocarbon alcohols and alcohol-ethers, e.g., ethanol, butanol, ethylene glycol, dithylene glycol, and the monoalky ethers of ethylene, diethylene, propylene and dipropylene glycol, monomethy ether of ethylene glycol (hereinafter referred to also as methyl "Cellosolve"), mixtures thereof and the like.

The following examples are presented. In these examples, unless otherwise specified, all parts and percentages are by weight, refluxing wherever performed was at atmospheric pressures, and all curing testing, mixing and other steps wherein no temperatures are specified were conducted at the ambient temperature. Also, wherever employed herein φ designates the phenyl group, Me designates the methyl group, Et designates the ethyl group, Bu designates the butyl group and Vi designates the vinyl group. By the term "percent active ingredients" is meant the percentage of non-volatile material comprising the aminoorganosilicon compound-epoxy compound mixture or reaction product contained by the adhesive composition, the remainder being the volatile diluent. For example, a composition containing 5% active ingredients contains 5% non-volatiles as described above and 95% volatile diluent.

The following amino-organosilicon compounds were employed in the examples.

Composition A: gamma-aminopropylsiloxane, $[H_2N(CH_2)_3SiO_{3/2}]$

Composition B: delta-aminobutyl(methyl)-siloxane hydrolyzate, $[H_2N(CH_2)_4Si(Me)O]_x$, made by reacting 100 g. of water with 300 g. of delta-aminobutyl(methyl)-diethoxysilane and stripping of volatiles comprising water and ethanol.

Composition C: delta-aminobutyl(methyl)-siloxane cyclic tetramer, $[H_2N(CH_2)_4Si(Me)O]_4$.

Composition D: gamma-aminopropylsiloxane-amylsiloxane, $[H_2N(CH_2)_3SiO_{3/2}]_{0.5}[C_5H_{11}SiO_{3/2}]_{0.5}$ Composition E: $Me_3SiO[Me_2SiO]_{60}[H_2N(CH_2)_4Si(Me)O]_{35}SiMe_3$, made by KOH-catalyzed equilibration of 50 wt. percent Composition C, 45 wt. percent $[Me_2SiO]_4$ and 5 wt. percent $Me_3SiO[Me_2SiO]_4SiMe_3$ Composition F: gamma-aminopropylsiloxane-phenylsiloxane, $[H_2N(CH_2)_3SiO_{3/2}]_{0.5}[\phi SiO_{3/2}]_{0.5}$ Composition G: gamma-aminopropylsiloxane-methylsiloxane, $[H_2N(CH_2)_3SiO_{3/2}]_{0.5}[CH_3SiO_{3/2}]_{0.5}$ Composition H: gamma-aminopropylsiloxane-vinyl-siloxane, [H₂N(CH₂)₃SiO₃/₂]₀.₅[ViSiO₃/₂]₀.₅

The amino-organosilicon compounds of Compositions A, D, F, G and H are represented by highly idealized formulas. These compounds can and do contain certain small amounts of hydroxy and alkoxy groups bonded to silicon. Each of Compositions A, D, F, G and H were made by mixing the respective types and amounts of amino-organosilicon compound and hydrocarbylsilicon compound (if any) listed in the following table with the respective amounts of water and solvent (if any) as listed in the table and refluxing for the times listed in the next to last column of the table. Each of the compositions thus prepared contained the percent active ingredients correspondingly listed in the last column of the table.

Shore A hardness of 50. The tensile strengths of silicone rubbers I, II and III respectively were 1000 p.s.i., 1500 p.s.i. and 900 p.s.i., the higher tensile strength rubber being obtained by employing a gumstock having a higher proportion of vinyl groups per silicon atom.

The SBR rubber used in the examples was made from the following formulation.

100 parts styrene-butadiene copolymer containing about 80% styrene and 80% butadiene in polymerized condition
50 parts Philblack O (a carbon black filler)
5 parts zinc oxide
2 parts stearic acid
2 parts sulfur
1 part Santowhite (a commercially available antioxidant; 4,4'-butylidine-bis(6 tert-butyl-metal cresol)

| Composition | Amino-Organosilicon | | Hydrocarbylsilicon | Water, Moles | Solvent | | Reflux Time (Hours) | Percent Active Ingredient |
|---|---|---|---|---|---|---|---|---|
| | Moles | Type | | | Grams | Type | | |
| A | 1 | H₂N(CH₂)₃Si(OEt)₃ | | 1.5 | 0 | | 4 | 47 |
| D | 1 | H₂N(CH₂)₃Si(OEt)₃ | | 4.5 | 0 | | ¹24 | 43.5 |
| F | 1 | H₂N(CH₂)₃Si(OEt)₃ | C₅H₁₁Si(OEt)₃ | 3.0 | 283 | C₂H₅OH | 4 | 30 |
| G | 1 | H₂N(CH₂)₃Si(OEt)₃ | φSi(OEt)₃ | 4.5 | 28 | C₂H₅OH | 4.5 | 35 |
| H | 1 | H₂N(CH₂)₃Si(OEt)₃ | CH₃Si(OEt)₃ | 4.5 | 56 | C₂H₅OH | 4.5 | 35 |
| | | | ViSi(OEt)₃ | | | | | |

¹ 0.5 g. KOH added prior to refluxing.

Compositions B, C and E each are employed at 100% active ingredients.

The following resin-forming materials, Compositions I, J and K, were employed in the examples. These compositions were prepared by refluxing the amounts and types of amino-organosilicon compound and hydrocarbylsilicon compound (if any) with the amount of epoxy compound and the amounts and types of solvent, all as listed in the following table. Refluxing time for each composition and the percent active ingredients of each composition are also correspondingly listed in the table.

Silicone rubbers employed in the examples were cured dimethyl silicone elastomers made from a predominantly dimethylsiloxane [(Me₂SiO)ₓ] gumstock containing a small amount of vinyl groups in place of methyl groups bonded to silicon by adding a silicious filler and cross-linking through the vinyl groups with di-tertiarybutyl peroxide and heat. Each of the silicone rubbers had a 1 part NOBS No. 1 (a commercially available accelerator N-oxydiethylene benzothiazole sulfenamide)
1 part latent accelerator (CW-1015, piperidine loaded on a molecular sieve)

The neoprene rubber used in the examples was made from the following formulations.

100 parts poly(chloroprene) neoprene WRT
30 parts SRF black (a carbon black filler)
1 part Neozone A (an antioxidant, phenyl-alpha-naphthylamine)
5 parts zinc oxide
2 parts Maglite D (an extra five calcined magnesium oxide)
0.5 part stearic acid
2 parts latent accelerator (CW-3120, diethyl thiourea loaded on a molecular sieve)

| Composition | Amino-Organosilicon Compound | | | Hydrocarbylsilicon Compound | | Epoxy Compound | | Solvent | | Reflux Time (Hours) | Percent Active Ingredient |
|---|---|---|---|---|---|---|---|---|---|---|---|
| | Moles | Grams | Type | Moles | Type | Grams | Eq. | Grams | Type | | |
| I | | 92.4 | Composition F | | | 22.3 | 0.116 | 522 / 363 | Toulene / Cellosolve | 4.5 | 5.0 |
| J | 1 | 221.0 | H₂N(CH₂)₃Si(OEt)₃ | 1 | φSi(OEt)₃ | 192.0 | 1 | 218 / ¹290 / ¹1,730 | Toluene / Me Cellosolve / Toluene | 22 | 15.0 |
| K | | 23.6 | Composition X | | | 13.3 | 0.07 | 184 / 95 / 95 / (²) / (²) / (²) | Toluene / N-Butanol / Bu Cellosolve / Toluene / N-Butanol / Bu Cellosolve | 8 | 7.5 |

¹ Indicates the listed solvents were added subsequent to refluxing.
² Indicates the listed solvents were added subsequent to refluxing as 90:5:5, toulene:N-Butanol:Bu Cellosolve solvent mixture in sufficient quantity to dilute to the listed 7.5% active ingredients.
Epoxy Compound is the diglycidyl ether of bisphenol A having the formula:

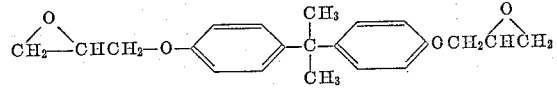

which has an epoxy equivalency equal to about 192.
Composition X was prepared by refluxing 7.7 g. gamma-aminopropyltriethoxysilane, 8.4 g. of phenyltriethoxysilane, 6.2 g. of methyltriethoxysilane and 1.4 g. of water for 5 hours.
Me Cellosolve—monomethyl ether of ethylene glycol.
Bu Cellosolve—monobutyl ether of ethylene glycol.

Example 1

Two ½″ x 3″ pieces of fully cured silicone rubber were cleaned by wiping with a toluene-soaked cloth. They were then immersed 3 minutes in a 10% active ingredients solution of Composition K. After standing overnight the pieces were pressed together with metal clips and placed in a forced air circulating oven 1.5 hours at 200° C. After cooling 30 minutes the metal clips were removed and the silicone rubber pieces were found to be so firmly bonded that peeling stress resulted in rupture of one of the rubber pieces in preference to the joined area. Two other silicone pieces cleaned, joined and heat treated in a similar manner except that immersion in Composition K was omitted, fell apart from each other when the metal clips were removed.

Example 2

Eight ½″ x 3″ pieces of fully cured silicone rubber I were cleaned by wiping with a toluene-soaked cloth. Two each were then respectively immersed 3 minutes in 5% active ingredient solutions of Compositions B, D, F and G. The pieces were then joined, cured and tested in a manner similar to Example 1. In every case firm bonds were obtained.

Example 3

Three ½″ x 3″ pieces of silicone rubber were cleaned by wiping with a toluene-soaked cloth. They were then respectively immersed 2 minutes in 5% active ingredient solutions of Compositions D, G and B. After standing overnight a ½″ x 3″ piece of Mylar film (3.5 mils thick) cleaned by wiping with a toluene-soaked cloth was pressed onto one face of each silicone rubber piece, held in place with metal clips, and placed in a forced air circulating oven for 3.0 hours at 125° C. After cooling 30 minutes the metal clips were removed, leaving the Mylar firmly bonded to the silicone rubber. Peeling stress resulted in rupture of the Mylar or rubber in preference to the joined area. A silicone rubber Mylar joint prepared exactly as the other joints except that no immersion in aminoalkylsilicone compound solution was made, fell apart when the metal clips were removed.

Example 4

Three ½″ x 3″ pieces of silicone rubber I were cleaned by wiping with a toluene-soaked cloth. Three ½″ x 3″ pieces of aluminum were cleaned by wiping with a toluene-soaked cloth, followed by scrubbing with grade 00 steel wool soaked in a slurry of Tide detergent (Procter & Gamble) in water, rinsing in water and acetone. The aluminum pieces were then immersed momentarily in one of the following solutions: a 10% active ingredient solution of Composition J, a 5% active ingredient solution of Composition I, a 10% active ingredient solution of Composition K. After standing 30 minutes, one face of each of the silicone rubber pieces was pressed onto a face of an aluminum piece and held in place with metal clips. The joints were then placed in a forced air circulating oven for 1.0 hour at 150° C. After cooling 30 minutes the metal clips were removed. A firm bond existed between the silicone rubber and aluminum, such that peeling stress resulted in rupture of the silicone rubber in preference to the joined area. A silicone rubber-aluminum joint prepared in a similar manner but without immersion in aminoalkylsilicon compound solution, fell apart when the metal clips were removed.

Example 5

Three ½″ x 3″ pieces of silicone rubber I and a ½″ x 3″ piece of SBR rubber were cleaned by wiping with a toluene-soaked cloth. A ½″ x 3″ piece of aluminum and a ½″ x 3″ piece of stainless steel were cleaned by the method described for aluminum in Example 4. All 6 pieces were then smeared with a 45% active ingredient solution of Composition D. After standing 5 minutes the 3 silicone rubber pieces were pressed onto the other 3 substrates and held in place with metal clips. The two silicone rubber-metal joints were placed in a forced air circulating oven for 2.0 hours at 200° C. The silicone rubber-SBR rubber joint was placed in a forced air circulating oven for 4.0 hours at 150° C. After cooling 30 minutes the metal clips were removed, disclosing firmly bonded joints. Similar joints without the Composition D treatment fell apart when the metal clips were removed.

Example 6

Nine ½″ x 3″ pieces of silicone rubber I and nine ½″ x 3″ pieces of SBR rubber were cleaned by wiping with a toluene-soaked cloth. One face each of a silicone rubber piece and an SBR rubber piece was smeared with one of the following aminoalkylsilicon compositions.

| Aminoalkylsilicone: | Percent active ingredient |
|---|---|
| C | 100 |
| K | 10 |
| D | 24 |
| H | 35 |
| J | 22.5 |
| H | 35 |
| B | 100 |
| E | 100 |
| A | 45 |

The pieces were air-dried 30 minutes and the treated silicone rubber faces pressed against the treated faces of the SBR rubber face. The joints were held together with metal clips. They were placed in a forced air circulating oven for 1.0 hour at 150° C., cooled 30 minutes and the clips removed. In every case a firm bond was found, such that when peel stress was applied the silicone rubber broke in preference to the joined area.

Example 7

Five ½″ x 3″ pieces of silicone rubber I and five ½″ x 3″ pieces of neoprene rubber were cleaned by wiping with a toluene-soaked cloth. One face each of a silicone rubber piece and a neoprene rubber piece was smeared with one of the following aminoalkylsilicon compositions.

| Aminoalkylsilicon composition: | Percent active ingredients |
|---|---|
| A | 45 |
| B | 100 |
| B | 50 |
| C | 50 |
| C | 100 |

No air-drying was allowed. The treated silicone rubber faces were immediately pressed against the treated faces of the neoprene rubber piece and the joints held together with metal clips. The joints were placed in a forced air circulating oven for 1.0 hour at 150° C., cooled 30 minutes and the clips removed. In every case a firm bond was found, such that when peel stress was applied the silicone rubber broke in preference to the joined area. A silicone rubber-neoprene rubber joint with similar treatment except that no aminoalkylsilicon composition was applied, fell apart when the metal clips were removed.

Example 8

1″ x 6″ specimens of silicone rubber II, silicone rubber III, and 2 pieces of neoprene were cleaned by wiping with an acetone-soaked cloth. The neoprene rubber specimens were then brushed with two coats of Composition A at 45% solids concentration, allowing 30 minutes air dry between applications. After standing 60 minutes the silicone rubber pieces were joined to the neoprene pieces, inserting a Teflon sheet between the pieces at one end of the joined area. This was to give an unbonded area as a starting point for tear strength measurements. The joints were cured 15 minutes at 150° C. using 50 p.s.i. pressure. Peel strength was measured on the Scott tensile tester Model L-4 after standing overnight. Peel strength of the silicone rubber II-neoprene rubber joint was 8 lbs. per inch. Peel strength of the silicone rubber III-neoprene rubber joint was lbs. per inch. Rupture was mostly along the adhesive interface with a small amount of rubber tear.

*Example 9*

Two ½" x 3" pieces of Mylar film (3.5 mils thick) were cleaned by wiping with a toluene-soaked cloth. One ½" x 3" stainless steel piece and one ½" x 3" aluminum piece were cleaned by the method described for cleaning aluminum in Example 4. All four pieces were then smeared with a 45% active ingredient solution of Composition D, air dried 5 minutes, and the treated face of a Mylar piece pressed onto the treated face of a metal piece. The joints were held together with metal clips and placed in a forced air circulating oven for 2.0 hours at 200° C. After cooling 30 minutes the metal clips were removed. The Mylar was bonded so firmly to the metal in both cases that peeling stress resulted in breaking of the Mylar film in preference to the joined area. Mylar-metal joints with a similar treatment except that the Composition D treatment was omitted, fell apart when the metal clips were removed.

*Example 10*

A ½" x 3" piece of Mylar film and ½" x 3" piece of SBR rubber were cleaned by wiping with a toluene-soaked cloth. Both pieces were immersed 2 minutes in a 5% active ingredient solution of Composition G. After standing overnight the pieces were pressed together and held with metal clips. They were placed in a forced air circulating oven for 3.0 hours at 125° C. After cooling 30 minutes the metal clips were removed and a firm bond was found between the two substrates. A Mylar film-SBR rubber joint with similar treatment except that the Composition G-immersion was omitted, fell apart when the metal clips were removed.

*Example 11*

Two ½" x 3" pieces of aluminum were cleaned by the method described for cleaning aluminum in Example 4. One face of each was smeared with a 45% active ingredient solution of Composition D, air dried 5 minutes, the treated faces pressed together and held with metal clips. The joint was placed in a forced air circulating oven for 2.0 hours at 200° C. After cooling 30 minutes the metal clips were removed and the aluminum pieces were found to be firmly bonded to each other.

*Example 12*

Two ½" x 3" pieces of aluminum were cleaned by the method described for cleaning aluminum in Example 4. One ½" x 3" piece of SBR rubber and neoprene rubber were cleaned by wiping with a toluene-soaked cloth. One face of each of the four pieces was smeared with a 45% active ingredient solution of Composition D, air dried 5 minutes and the treated face of a metal piece pressed against the treated face of a rubber piece. The joints were held together with metal clips and placed in a forced air circulating oven for 4.0 hours at 150° C. After cooling 30 minutes the metal clips were removed, disclosing firm bonds between aluminum and rubber. Aluminum-rubber joints treated similarly except that the Composition D treatment was omitted, fell apart when the metal clips were removed.

*Example 13*

The procedude of Example 12 was followed exactly except that stainless steel was substituted for aluminum. Firm bonding between stainless steel and rubber was obtained.

*Example 14*

Two ½" x 3" pieces of SBR rubber were cleaned by wiping with a toluene-soaked cloth. One face of each was smeared with a 45% active ingredient solution of Composition D. A ½" x 3" piece of nylon fabric was pressed onto the treated surface of one piece, and a ½" x 3" piece of rayon fabric was pressed onto the treated surface of the other piece. The joints were held together with metal strip backing and screw clamps, and placed in a forced air circulating oven for 16.0 hours at 150° C. After cooling 30 minutes the metal backing and screw clamps were removed disclosing firm bonds between the fabrics and rubber. Fabric-rubber joints with similar treatment except that Composition D smear was omitted, fell apart when the backing was removed.

What is claimed is:

1. A process for adhesively bonding:
   (I) a first member having a cured silicone rubber surface, said cured silicone rubber having been produced by curing a linear siloxane gum having an average of about two organic substituents on each silicon atom, which organic substituents are selected from the group consisting of the methyl, vinyl, phenyl, beta-cyanoethyl and ethyl groups, to
   (II) a second member having a surface composed of a member selected from the group consisting of metal, synthetic organic fabric selected from the group consisting of (a) nylon cloth, (b) rayon cloth, (c) woven ethylene glycol-terephthalate polyester fibers, and (d) woven vinyl chloride-acrylonitrile copolymer fibers, cured silicone rubber, said cured silicone rubber having been produced by curing a linear siloxane gum having an average of about two organic substituents on each silicon atom, which organic substituents are selected from the group consisting of the methyl, vinyl, phenyl, beta-cyanoethyl and ethyl groups, and polyethylene terephthalate films, which process comprises disposing an adhesive material selected from the group consisting of:
   (A) an amino-organosilicon compound selected from the group consisting of:
      (1) silanes represented by the formula:

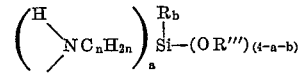

wherein R''' is an alkyl group, R is a monovalent hydrocarbon group, $n$ is an integer having a value from 3 to 9 inclusive, $a$ is an integer having a value from 1 to 3 inclusive, $b$ is an integer having a value from 0 to 2 inclusive, the sum of $a+b$ is not greater than 3, the

group is attached to a carbon atom which is at least two carbon atoms removed from the silicon atom and the free valence of the nitrogen atom is attached to a member selected from the group consisting of hydrogen, the aminoalkyl groups and the monovalent hydrocarbon groups; and (2) siloxanes comprising groups represented by the formula:

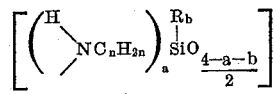

wherein R, $n$, $a$, $b$, $a+b$, the position of the

group and the group attached to the free valence of nitrogen are as defined above; and
(B) a curable reaction product of said amino-organo-silicon compound and an epoxy compound, between and in adhesive contact with said surface of said members; and heating said adhesive material to a temperature of at least 125° C.

2. The process of claim 1 wherein epoxy compound has the formula:

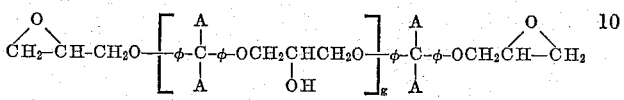

wherein A is a member selected from the group consisting of the hydrogen atom and the alkyl groups, and φ is a phenylene group and g is a number representing the average chain length of the polymer.

3. The process of claim 1 wherein the second member has a steel surface.

4. The process of claim 1 wherein the second member has a copper surface.

5. The process of claim 1 wherein the second member has an aluminum surface.

6. The process of claim 1 wherein the adhesive material is gamma-aminopropyltriethoxysilane.

7. The process of claim 1 wherein the adhesive material is a curable reaction product of gamma-aminopropyltriethoxysilane and an epoxy compound having the formula:

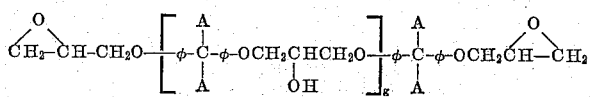

wherein A is a member selected from the group consisting of the hydrogen atom and the alkyl groups, and φ is a phenylene group and g is a number representing the average chain length of the polymer.

8. The process of claim 1 wherein the adhesive material is a gamma-aminopropylsiloxane.

9. The process of claim 1 wherein the adhesive material is a curable reaction product of a gamma-aminopropysiloxane and an epoxy compound having the formula:

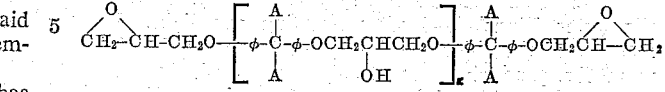

wherein A is a member selected from the group consisting of the hydrogen atom and the alkyl groups, and φ is a phenylene group and g is a number representing the average chain length of the polymer.

10. A composite article produced by the process of claim 1.

References Cited by the Examiner

UNITED STATES PATENTS

| | | | |
|---|---|---|---|
| 2,579,418 | 12/51 | Cheronis | 260—42 |
| 2,601,337 | 6/52 | Smith-Johannsen. | |
| 2,695,276 | 11/54 | Hatcher | 260—47 |
| 2,762,823 | 9/56 | Speier | 260—46.5 XR |
| 2,819,245 | 1/58 | Shorr | 260—42 |
| 2,832,754 | 4/58 | Jex et al. | 260—46.5 |
| 2,860,083 | 11/58 | Nitzsche et al. | 154—139 |
| 2,865,918 | 12/58 | Hurwitz et al. | |
| 2,885,384 | 5/59 | Sterman | 117—161 |
| 2,902,389 | 9/59 | Keil | 260—448.2 |
| 2,907,782 | 10/59 | Pike | 260—46.5 |
| 2,946,701 | 7/60 | Pluddemann | 260—448.2 |
| 2,947,771 | 8/60 | Bailey | 260—448.2 |

OTHER REFERENCES

Modern Plastics Encyclopedia for 1959 (October 1958), page 108 cited.

"Epoxies," Modern Plastics, October 1952, pages 89–94, "Epon Resins," Paint Oil and Chemical Review, November 9, 1950, pages 15–18.

ALEXANDER WYMAN, *Primary Examiner.*

EARL M. BERGERT, CARL F. KRAFFT, *Examiners.*